(12) United States Patent
Fujimoto

(10) Patent No.: US 7,437,300 B2
(45) Date of Patent: Oct. 14, 2008

(54) POSITIONAL INFORMATION MANAGEMENT SYSTEM

(75) Inventor: Jun Fujimoto, Tokyo (JP)

(73) Assignee: Aruze Corp., Tokyo (JP)

( * ) Notice: Subject to any disclaimer, the term of this patent is extended or adjusted under 35 U.S.C. 154(b) by 711 days.

(21) Appl. No.: 10/735,816

(22) Filed: Dec. 16, 2003

(65) Prior Publication Data

US 2004/0138918 A1 Jul. 15, 2004

(30) Foreign Application Priority Data

Dec. 16, 2002 (JP) .......................... P2002-364347

(51) Int. Cl.
G06Q 10/00 (2006.01)
G08B 5/22 (2006.01)
H04Q 7/00 (2006.01)

(52) U.S. Cl. .......................... 705/1; 705/5; 340/539.13; 340/825.49

(58) Field of Classification Search .................. 705/1, 705/5, 16, 18, 21; 340/539.13, 825.28, 825.49
See application file for complete search history.

(56) References Cited

U.S. PATENT DOCUMENTS

| | | | |
|---|---|---|---|
| 5,455,851 A | 10/1995 | Chaco et al. | |
| 6,154,139 A | 11/2000 | Heller | |
| 6,225,906 B1 | 5/2001 | Shore | |
| 6,226,622 B1 * | 5/2001 | Dabbiere | 705/28 |
| 6,396,413 B2 | 5/2002 | Hines et al. | |
| 6,400,272 B1 | 6/2002 | Holtzman et al. | |
| 6,531,963 B1 | 3/2003 | Nyfelt | |
| 6,825,763 B2 * | 11/2004 | Ulrich et al. | 340/539.1 |
| 6,965,317 B2 | 11/2005 | Fujimoto | |
| 2001/0034623 A1 * | 10/2001 | Chung | 705/5 |
| 2002/0041234 A1 | 4/2002 | Kuzma et al. | |
| 2002/0183979 A1 | 12/2002 | Wildman | |
| 2003/0074281 A1 | 4/2003 | Hoffman et al. | |
| 2004/0010445 A1 * | 1/2004 | Schuette | 705/13 |

(Continued)

FOREIGN PATENT DOCUMENTS

GB 2 355 876 5/2001

(Continued)

OTHER PUBLICATIONS

Baker, Richard et al., Inmate Tracking with Biometric and Smart Card Technology, Jul. 2001, Corrections Today, p. 75 vol. 63 No. 4, pp. 1-5.*

(Continued)

*Primary Examiner*—Jamisue A Plucinski
(74) *Attorney, Agent, or Firm*—Leydig, Voit & Mayer, Ltd.

(57) ABSTRACT

A positional information management system includes a tag attached to an article and having a tag IC storing a tag ID; detectors, each detector having a detector ID and being installed in a hotel, for detecting the tag ID transmitted from the tag IC, the tag ID and the detector ID being transmitted by the detector; a recording device recording pairs of the tag ID and the detector ID, and time at which the tag ID has been detected; and a positional information management device for managing positional information of the article, based on the pairs and the times recorded. Positional information of the articles in the hotel or in various hotel facilities can be obtained.

10 Claims, 14 Drawing Sheets

U.S. PATENT DOCUMENTS

| | | | |
|---|---|---|---|
| 2004/0153334 A1* | 8/2004 | Dione | 705/1 |
| 2005/0078006 A1 | 4/2005 | Hutchins et al. | |
| 2005/0246359 A1* | 11/2005 | Robbins | 707/100 |
| 2005/0288937 A1* | 12/2005 | Verdiramo | 705/1 |

FOREIGN PATENT DOCUMENTS

| | | |
|---|---|---|
| JP | 2000-357272 | 12/2000 |
| JP | 2001-229350 | 8/2001 |
| JP | 2002-123619 | 4/2002 |
| JP | 2002-140631 | 5/2002 |
| JP | 2003-047775 | 2/2003 |
| JP | 2003-047779 | 2/2003 |
| JP | 2003-053041 | 2/2003 |
| JP | 2003-53042 | 2/2003 |
| JP | 2003-132435 | 5/2003 |
| JP | 2003-144760 | 5/2003 |
| JP | 2003-150838 | 5/2003 |
| JP | 2003-150852 | 5/2003 |
| JP | 2003-305271 | 10/2003 |
| WO | WO 02/091297 | 11/2002 |

OTHER PUBLICATIONS

United Testing Self Check-In Kiosks in San Diego; State of The Art Technology Will Reduce Airport Line Waits and Airport Hassle; New Initiative Deployed on The Heels of Other Major Investments Improving Service, Oct. 23, 2000, PR Newswire, Financial News, pp. 1-3.*

Wang, Z et al., Casino Technology; Player Tracking and Slot Accounting Systems, 2001, Gaming Research and Review Journal, vol. 6, No. 1, pp. 43-56; pp. 1-12.*

Brian W. Martin, "Watchit, A Fully Supervised Identification, Location and Tracking System", Security Technology, 1995, Proceedings, Institute of Electrical and Electronic Engineers 29th Annual 1995 International Carnahan Conference on Sanderstead, UK Oct. 18-20, 1995, New York, NY, USA, IEEE, US, Oct. 18, 1995, pp. 306-310, XP010196430.

* cited by examiner

Fig.6

POSITIONAL INFORMATION (DATA COLLECTION)

| DATE | TIME | TAG ID | LOCATION |
|---|---|---|---|
| | : | : | : |
| | 10:00 | T-***9012 | P-1002 |
| | 10:00 | T-***9023 | P-1003 |
| | 10:00 | T-***1001 | P-2002 |
| | 10:00 | T-***1002 | P-2002 |
| | 10:00 | T-***3214 | P-3098 |
| | 10:01 | T-***2003 | P-1002 |
| | 10:01 | T-***2221 | P-1002 |
| | 10:01 | T-***5236 | P-1002 |
| MONTH /DAY | 10:01 | T-***9012 | P-1002 |
| | 10:01 | T-***9041 | P-4023 |
| | : | | : |
| | 19:35 | T-***9036 | P 1002 |
| | 19:35 | T-***9044 | P-1002 |
| | 19:35 | T-***1001 | P-3012 |
| | 19:35 | T-***1002 | P-3012 |
| | 19:35 | T-***6523 | P-1003 |
| | 19:36 | T-***2003 | P-5012 |
| | 19:36 | T-***6002 | P-1002 |
| | 19:36 | T-***7003 | P-1002 |
| | : | : | : |

Fig.7

CORRESPONDENCE RELATIONSHIP OF:
TAG ID-GUEST ROOM NO.-NAME

| GUEST ROOM NO. | TAG ID | NAME OF USER |
|---|---|---|
| R-101 | T-*1001 ~ T-*1010 | ○○ ** |
| | T-*1011 ~ T-*1020 | ○○ *△ |
| R-102 | — | — |
| R-103 | T-*1051 ~ T-*1060 | ** ○ |
| R-104 | T-*2001 ~ T-*2010 | △ ** |
| | T-*2011 ~ T-*2020 | ○× △△ |
| R-105 | C-7777 | ○○ ○○ |
| ⋮ | | ⋮ |

Fig.8

POSITIONAL (MOVEMENT) INFORMATION (BASED ON TAG ID)

| TAG ID | DATE | TIME | LOCATION | NOT-PERMITTED FLAG |
|---|---|---|---|---|
| T-*1001 | MONTH/**DAY | 10:00 | P-2002 | 0 |
| | | : | : | : |
| | | 19:35 | P-3012 | 0 |
| | | : | : | : |
| T-*1002 | MONTH/**DAY | 10:00 | P-2002 | 0 |
| | | : | : | : |
| | | 19:35 | P-3012 | 0 |
| | | : | : | : |
| T-*2003 | MONTH/**DAY | 10:01 | P-1002 | 0 |
| | | : | : | : |
| | | 19:36 | P-5012 | 1 |
| | | : | : | : |

Fig.9

POSITIONAL (MOVEMENT) INFORMATION (BASED ON LOCATION)

| LOCATION | DATE | TIME | TAG ID |
|---|---|---|---|
| P-1001 | MONTH/DAY | : | : |
| | | 10:00 | T-***9003 |
| | | 10:00 | T-***9014 |
| | | 10:00 | T-***9005 |
| | | 10:01 | T-***9003 |
| | | 10:01 | T-***9005 |
| | | 10:02 | T-***9003 |
| | | 10:02 | T-***9005 |
| | | : | : |
| P-1002 | MONTH/DAY | : | : |
| | | 10:00 | T-***9102 |
| | | 10:00 | T-***9203 |
| | | 10:00 | T-***9036 |
| | | 10:01 | T-***9102 |
| | | 10:01 | T-***9111 |
| | | 10:02 | T-***9111 |
| | | 10:02 | T-***9036 |
| | | : | : |

Fig.10

TAG USE HISTORY

| TAG ID | GUEST ROOM NO. | USE HISTORY |
|---|---|---|
| T-***1001 | R-101 | *YEAR/*MONTH/*DAY/*HOUR:*MINUTE-*YEAR/*DAY/*HOUR:*MINUTE |
| T-***1002 | R-101 | *YEAR/*MONTH/*DAY/*HOUR:*MINUTE-*YEAR/*DAY/*HOUR:*MINUTE |
| T-***1003 | R-101 | *YEAR/*MONTH/*DAY/*HOUR:*MINUTE-*YEAR/*DAY/*HOUR:*MINUTE |
| T-***1234 | R-103 | *YEAR/*MONTH/*DAY/*HOUR:*MINUTE-*YEAR/*DAY/*HOUR:*MINUTE |
|  | : |  |

Fig.11

CORRESPONDENCE DATA OF:
TAG ID - RESTRICTED AREA

| TAG ID | RESTRICTED AREA |
|---|---|
| T-*001 ~ T-*999 | P4001 ~ P4999 |
| T-A001 ~ T-A999 | — |
| : | : |

Fig. 13

HOTEL SERVER

| DATE | GUEST ROOM NO. | TAG ID | USER INFORMATION | | | | |
|---|---|---|---|---|---|---|---|
| | | | NAME | RESIDENCE | TELEPHONE NUMBER | ... | INFORMATION PROVIDER AUTHENTICATED |
| MONTH /DAY | R-101 | T-*1001 ~ T-*1010 | * | -** | -*** | ⋮ | ○ |
| | | T-*1011 ~ T-*1020 | * | -** | -*** | ⋮ | × |
| | R-102 | — | — | — | — | — | — |
| | R-103 | T-*3251 ~ T-*3260 | * | -** | -*** | ⋮ | ○ |
| | R-104 | T-*3441 ~ T-*3450 | * | -** | -*** | ⋮ | ○ |
| | | T-*3451 ~ T-*3460 | * | -** | -*** | ⋮ | ○ |
| .. | .. | .. | .. | .. | .. | .. | .. |

POSITIONAL INFORMATION MANAGEMENT SYSTEM

CROSS REFERENCE TO RELATED APPLICATIONS

This application is based upon and claims the benefit of priority of Japanese Patent Application No. 2002-364347, filed in Japan on Dec. 16, 2002, the entire contents of which are incorporated herein by reference.

This application is related to U.S. patent application Ser. No. 10/735,821, now U.S. Pat. No. 6,965,317, entitled "POSITIONAL INFORMATION MANAGEMENT SYSYTEM" claiming the priority of Japanese Patent Application No. 2002-364346, filed in Japan on Dec. 16, 2002. The application, including specification, drawing, and claims, is expressly incorporated herein by reference in its entirety.

BACKGROUND OF THE INVENTION

1. Field of the Invention

The present invention relates to a positional information management system in a hotel, whereby, in hotels or various facilities that are provided in hotels, it is possible to ascertain and manage the location of personal belongings of a user.

2. Related Background Art

Technology involving the use of magnetic cards or IC cards in hotels and related facilities has previously been proposed. For example, a system has been proposed in which a card key is employed instead of a mechanical key as the key of a guest room and a system has been proposed in which settlement of charges for use is performed using a card. It has also been proposed to simplify management of customers, guest rooms, facilities or office work by giving a non-contact IC card a booking function for facilities of various types and/or a function of service point management. Such management of hotel business or related facilities is proposed in for example Laid-open Japanese Patent Application No. 2000-357272.

In the conventional system, individual processes such as for example opening/closing of locks, settlement of charges for use, booking, or service point management are managed in management of for example customers, guest rooms, facilities or offices. In the conventional system, information regarding the movement of the user's personal belongings within hotels and the various facilities is not acquired.

In order to increase the efficiency of utilization of hotels and the various facilities thereof, to increase customers' convenience, and to improve security of hotels and the various facilities thereof, it is necessary to know how user's personal belongings are moving within the hotel and the facilities.

In conventional systems, since management is merely performed treating each process as a unit, there is the problem that even if improvement in efficiency of the individual processes is sought, it is not possible to perform integrated management including for example the history of movement of user's personal belongings in the hotel or related facilities as a whole.

Accordingly, an object of the present invention is to solve the problems described above and to ascertain positional information of user's personal belongings in a hotel or the various facilities provided by a hotel.

SUMMARY OF THE INVENTION

According to the present invention, a tag that has a tag ID is attached to articles (for example, personal belongings of users) and detectors that detect this tag ID are installed at various locations in the hotel or facility. The location of the article is detected and recorded by detecting the tag ID by means of these detectors. The positional information of the article in the hotel or the various facilities provided by the hotel can thereby be ascertained. Mounting the tag ID on the articles can be performed by attaching the tag to the surface of the article or by attaching a luggage tag that has the tag ID to the article.

As used herein, the user of the article includes staff members of the hotel or facility, in addition to customers. By ascertaining the location of articles of customers within the hotel or facility, management of for example searches for lost articles can be achieved. Also, by ascertaining the location of articles of staff members within the hotel or facility, management of equipment or personal property employed by staff member can be achieved. In addition, security of the hotel and facilities can be improved by utilizing positional information of articles. Herein below, the expression "in the hotel" will be taken to include "within the facilities with which the hotel is provided".

The positional information management system according to the present invention can be applied for example in regard to movement history as to how a specific article is moving, in regard to movement history as to how articles are moving in a specified location, in regard to searching to ascertain where a specific article is in the hotel or facility, in regard to the provision of services in respect of articles within the hotel or facility, or in regard to ascertaining whether an article is in a specific area within the hotel or facility.

A positional information management system according to the present invention consists in a system for managing positional information of articles in a hotel, comprising a tag attached to an article and having a tag IC for storing a tag ID; a plurality of detectors each having a detector ID and being installed in a hotel, for detecting the tag ID via transmittance from the tag IC, the tag ID and the detector ID being transmitted; recording means for recording a pair of the tag ID and the detector ID, and a time at which the detector has detected; and positional information management means including the recording means, for managing positional information of the article, base on the pair and the time.

The each tag has a tag IC in which a tag ID is recorded. The tag itself can be specified by means of the tag ID and, in addition, the articles on which this tag is mounted can be specified, by establishing a one-to-one correspondence of such tag IDs and tags. Also, a tag can comprise a detachable sticker that may be freely attached to an article. Such a sticker may be formed as a film.

The detector constitutes detection means that detects the tag ID recorded on the tag IC via transmittance from the tag IC. The detectors are provided with a detector ID that is individually allocated and are installed at various locations in the hotel or in the various facilities of the hotel. The detectors send the detected tag ID together with its detector ID to positional information management means.

The recording means records the tag ID and the detector ID sent from the detectors as a pair, together with the detection time. The positional information management means is provided with recording means as described above and manages the positional information of articles in accordance with the tag ID, the detector ID and the detection time. The positional information management means records a correspondence relationship between the article and the tag ID of the tag, and identifies the article based on the tag ID.

In a first mode of use of the present invention, the movement history of article is managed. In this mode, the positional information management means detects the movement history of an article on which the tag is mounted within the hotel by identifying the article from the tag ID of the tag recorded in the recording means, identifies the location of the article on which the tag is mounted from the location of the detector from the detector ID and identifies the time from the detection time.

The users of the tag include hotel customers and hotel staff members; the movement history of the article of customers and the movement history of the article of staff members are separately managed using the tag IDs.

In a second mode of use of the present invention, the movement history of articles in a specific range is managed. In this mode, the positional information management means detects the movement history of articles within the hotel from the specific range that has been set as the range of detection of each detector ID and the article identified by the tag ID detected in this specific range. In this mode, it is possible to ascertain the movement history of article s within the hotel.

The users of the tags may be identified as hotel customers or hotel staff members and whether the articles (personal belongings) are customers' or the staff members' can be distinguished from the tag ID, making it possible to manage the movement history of the article of customers and the movement history of the article of staff members separately.

In a third mode of use of the present invention, searching for articles is managed. In this mode, the positional information management means detects the detector ID whish constitutes a pair with the tag ID corresponding to the article that is being searched for based on pairs of the tag IDs and the detector IDs recorded by the recording means, and is thereby able to find the location of the article in the hotel from the location of the detector having the detector ID that has thus been detected.

The positional information management system further comprises a terminal that is connected with the positional information management means. As this terminal, a front desk terminal or a card terminal could be employed. A front desk terminal means a terminal that is provided at the front desk of the hotel and a card terminal means a terminal that is provided within the hotel or facilities thereof. These terminals detect the tag ID via transmittance from the tag IC of the tag and requests the positional information management means to search for an article (a personal belonging of a user) based on the tag ID. The positional information management means searches for the locations of the article within the hotel based on the tag ID that is input (read) at the terminal, and sends this positional information to the terminal.

The correspondence relationship between the name of the user related to the article and the tag ID of the tag attached to the article is recorded in the recording means; the positional information management means can find the tag ID of the article that is being searched for from the name of the user and a search can also be conducted at the terminal for the location of the personal belonging in the hotel based on the name of the user.

In a fourth mode of use of the present invention, services provided by the hotel are managed. In this mode, the positional information management system further comprises service management means for matching services provided to customers who are users.

The service management means sends the tag ID of the tag mounted on the article of the customer to the positional information management means. The positional information management means detects the detector ID that constitutes a pair with the tag ID, and sends information as to the location of the detector corresponding to the detector ID to the service management means. It should be noted that, when information regarding the location of the detector that has the detector ID that forms a set with the tag ID is sent to the service management means, this "information regarding the location" is termed "positional information". The service management means can thereby manage the services that are provided to the article of the user by using the positional information of the article.

Also, the service management means sends the tag ID of the tag mounted on the article of the staff member to the positional information management means. The positional information management means then detects the detector ID that constitutes a pair with the tag ID and sends the location of the detector corresponding to the detector ID to the service management means. In this way, the service management means can manage the services that are provided to the article of the staff member by using the positional information of the article.

In a fifth mode of use of the present invention, the presence or absence of articles in an area within the hotel is managed. In this mode, the positional information management means establishes an area defined by at least one detector ID. The positional information management means then detects the detector ID that constitutes a pair with the detected tag ID based on the pairs of tag IDs and detector IDs recorded by the recording means. In addition, the positional information management means determines whether or not the article having the tag of the detected tag ID is present in the area, by comparing the detected detector ID with the detector ID that defines the area.

Thus, by establishing the area as a restricted area, if it is determined that an article that is not approved is present in the restricted area, security management can be conducted by generating an alarm or by setting a flag in the recording means.

It should be noted that the present invention could be embodied in the form of a system, in the form of a program for implementing the system, or in the form of a recording medium on which this program is recorded.

The present invention will be more fully understood from the detailed description given herein below and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 6 is an example of data collected by a positional information management system according to the present invention;

FIG. 7 is an example of correspondence data showing the correspondence relationship of tag ID, guest room No. and user name in a positional information management system according to the present invention;

FIG. 8 is an example of positional information of a personal belonging used in a positional information management system according to the present invention;

FIG. 9 is an example of positional information of a personal belonging used in a positional information management system according to the present invention;

FIG. 10 is an example of use history information of tags used in a positional information management system according to the present invention;

FIG. 11 is an example of restricted area data;

FIG. 13 is an example of data provided by a positional information management system hotel server according to the present invention;

DESCRIPTION OF THE PREFERRED EMBODIMENTS

Figure 1:
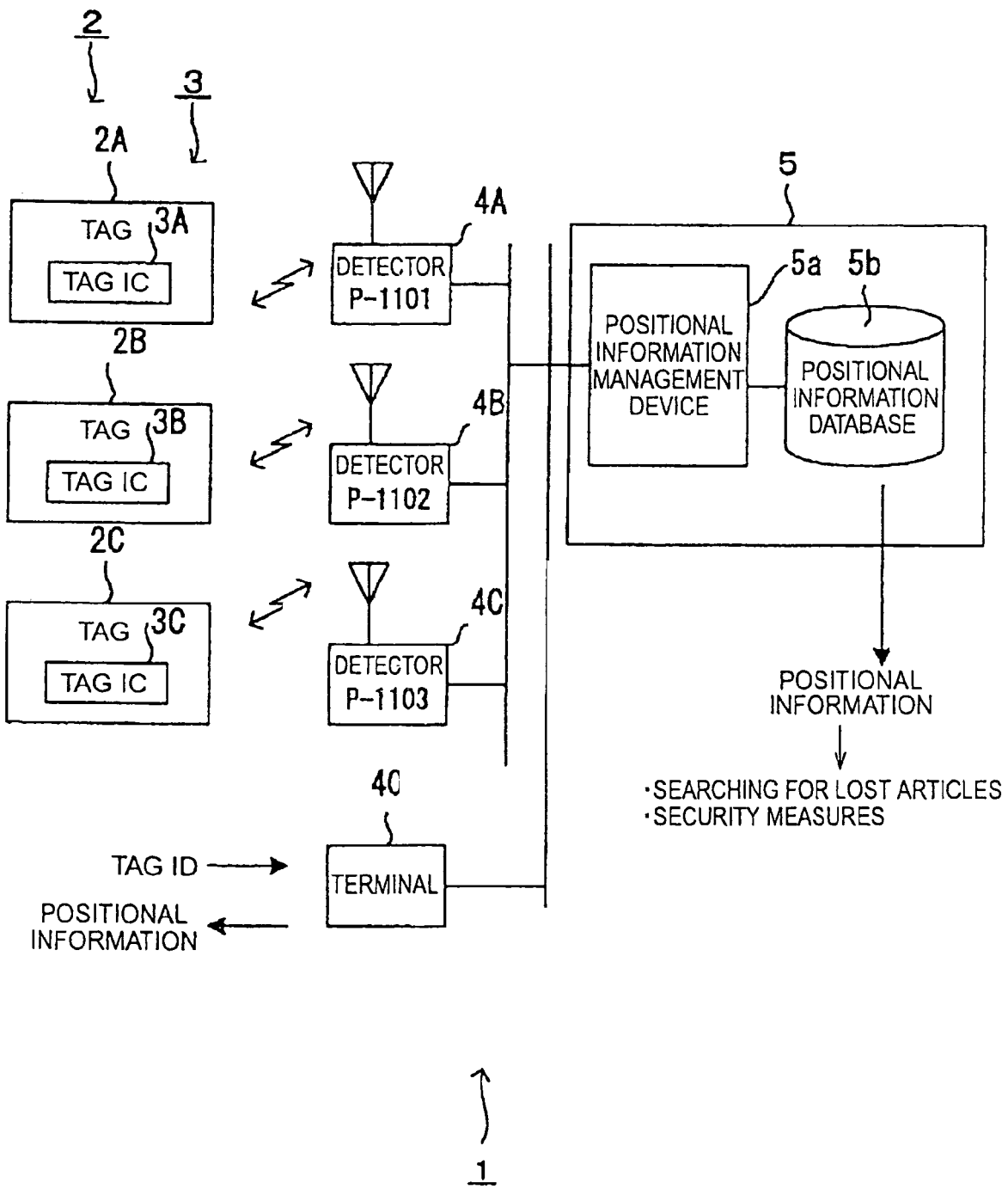
FIG. 1 is a block diagram given in explanation of a positional information management system according to the present invention.

Embodiments of the present invention are described in detail below with reference to the drawings. FIG. 1 is a diagram given in explanation of an outline of a positional information management system according to the present invention. In FIG. 1, a positional information management system 1 comprises tags 2 (2A to 2C), tag ICs 3 (3A to 3C), detectors 4 (4A to 4C) and a positional information management server 5.

Tags 2 (2A to 2C) respectively comprise tag ICs 3 (3A to 3C) in which is respectively set an individual tag ID and are attached to each personal belonging (article) of a user. Detectors 4 (4A to 4C) have respective individual detector IDs and exchange signals with the tag ICs 3 (3A to 3C) and can thereby read the tag ID that is set in a tag IC3 (3A to 3C) These detectors 4 (4A to 4C) are installed at various locations in the hotel or facility.

A tag ID as employed in the present invention performs exchange of signals with a tag IC by utilizing for example electromagnetic induction of a coil. A detector comprises a transmitter that transmits a carrier wave and a demodulator that demodulates the response signal (response wave) that is emitted from a tag IC in response to the transmitted carrier wave. The coil of a tag IC comprises a modulator that modulates with the tag ID the response wave induced by the carrier wave. The tag IC of a card returns to the detector a tag ID in response to the carrier wave of a read signal transmitted from the detector.

Such tag ICs can be formed in the form of a sheet and can be manufactured by a printing technique. The tag 2 may be formed by directly employing a tag IC in the form of such a sheet as a tag, or may be formed by attaching a tag IC in the form of a chip to the sheet. The tag 2 may be freely attached to a personal belonging. The attachment of the tag 2 to the personal belonging may be achieved by any desired means. For example, it may be attached to the surface of the personal belonging by applying adhesive to one face of the tag or may be attached to the personal belonging in the form of a so-called luggage tag.

Detectors 4 (4A to 4C) are connected with the positional information management server 5 by for example an internal LAN and transmit the detected tag ID, together with the detector ID with which each detector 4 is provided, to the positional information management server (positional information management means) 5. A positional information management device 5a of the positional information management server 5 receives the tag ID and the detector ID transmitted from the detector 4 (4A to 4C) and defines this tag ID and the detector ID as a set, which it then records in a positional information database (recording means) 5b together with the detection time. This tag ID can specify the personal belonging to which the tag 2 is attached, by specifying this tag ID. Also, by specifying the detector ID, the location where the detector 4 is installed in the hotel can be specified. Also, the time-point information can specify the time point at which the tag 2 was present (or passed) the vicinity where the detector 4 is installed. Positional information of the personal belonging to which the tag 2 is attached can therefore be acquired by means of this tag ID, detector ID and time-point information.

The tag ID, detector ID and time-point information recorded in the positional information database 5b can be read by requesting positional information using for example the tag ID information, from a terminal 40 connected with the positional information management server 5.

Also, in the case where the personal belonging belongs to the customer, positional information of the customer's personal belonging may be acquired from the positional information recorded in the positional information database 5b. In addition, the positional information of such personal belongings may be utilized for studies of frequency of use of the various facilities, for security measures or for emergency safety measures, for example. Also, in cases where the personal belonging belongs to the staff of the hotel or hotel-related facility, positional information of hotel equipment or staff's personal property can be acquired. Furthermore, such positional information can be utilized for security measures or staff disposition management and the like.

It should be noted that although, for purposes of explanation, an example is illustrated in FIG. 1 in which there are three tags 2 and tag ICs 3, there could be any required plurality of these, in accordance with the number of users using the hotel or facility. Also, regarding the detectors 4, although, for purposes of explanation, an example in which there are three detectors is illustrated in FIG. 1, any desired plurality of detectors could be employed in accordance with the size of the hotel or facility or range or accuracy of the detectors.

Figure 2:
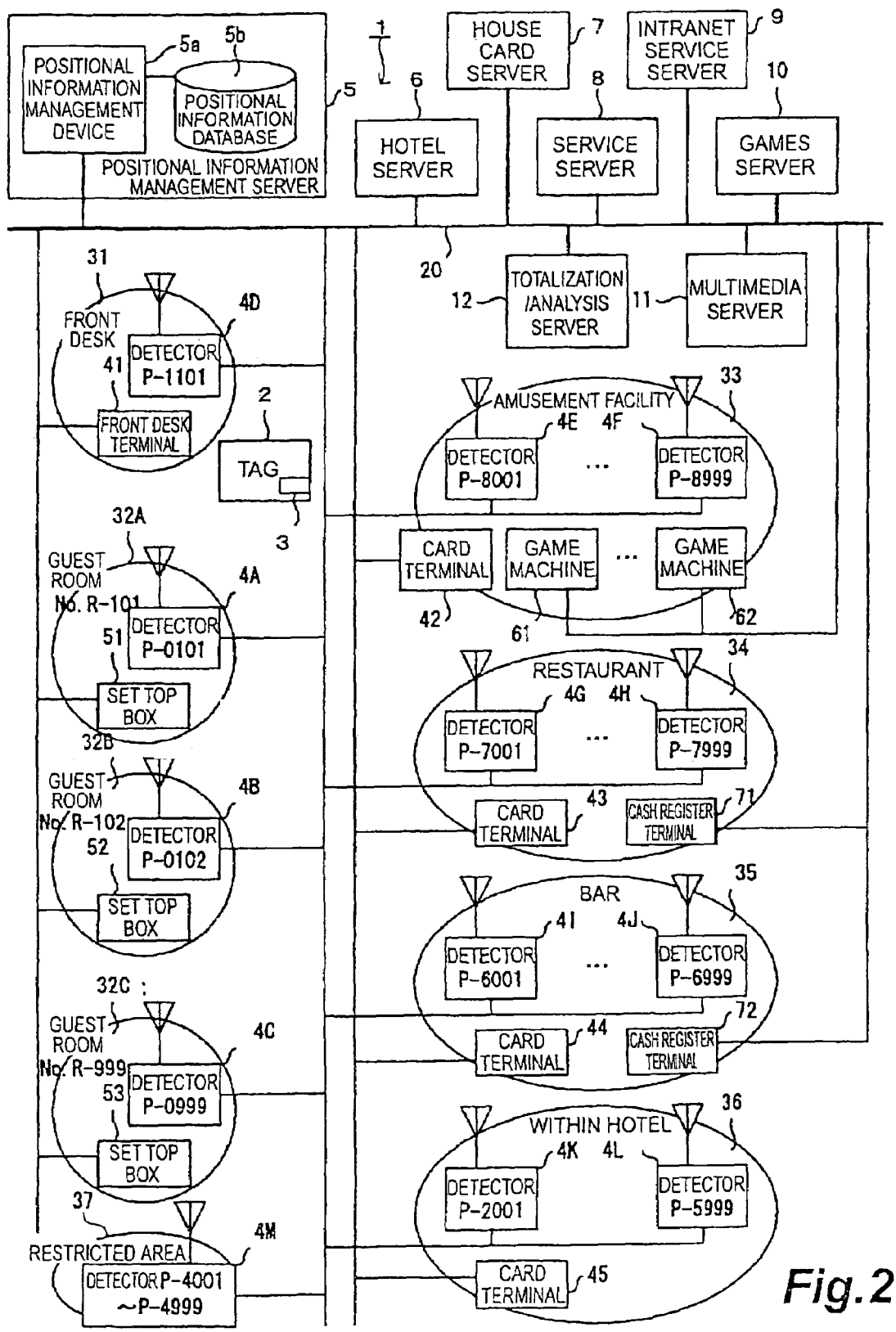
FIG. 2 is a diagram given in explanation of a more detailed example of the construction of a positional information management system according to the present invention.

FIG. 2 is a diagram given for purposes of explanation of an example of a more detailed layout of a positional information management system 1 according to the present invention.

In FIG. 2, just as in the case of the layout example of FIG. 1, the positional information management system 1 comprises tags 2, tag ICs 3, detectors 4 (4A to 4M) and a positional information management server 5. In addition, various servers such as a hotel server 6, house card server 7, service server (service management means) 8, intranet server 9, games server 10, multimedia server 11 or totalizing/analysis server 12 may be connected to the positional information management system 1 by means of a network such as an internal LAN.

The hotel server 6 is a server that performs overall management of hotel tasks typically performed by a hotel. The house card server 7 is a server that performs individual account management in the hotel when a customer employs a house card that performs payment processing by a deposit system to use the hotel or the various facilities (gaming facilities such as casinos or restaurants) with which the hotel is provided.

The service server 8 is a server that handles booking and issue of tickets for shows or events conducted in the hotel or facilities. The intranet server 9 is a server that manages a casino or games by means of an intranet within the hotel. The game server 10 is a server that performs management of deposits processed in gaming facilities. The multimedia server 11 is a server for on-demand use of video information in the guest rooms. Also, the totalizing/analysis server 12 is a server that performs flow management of the state of movement of customers, or staff disposition management, using positional information acquired by the positional information management server 5.

The tags 2 are provided with tag ICs 3 in which are respectively set individual tag IDs, so that a tag 2 can be identified from this tag ID. In addition, a user or a user's personal belonging can be identified from the correspondence relationship between tags 2 and users or users' personal belongings.

The detectors 4 are installed in various locations of the hotel and facilities. For example, detectors 4A to 4C are installed in guest rooms 32A to 32C, a detector 4D is installed at the front desk 31, detectors 4E to 4F are installed in an amusement facility 33, detectors 4G to 4H are installed in the restaurant 34, detectors 4I to 4J are installed at the bar 35, detectors 4K to 4L are installed at various other locations 36 within the hotel, and a detector 4M is installed in a restricted area 37 that is set up within the hotel.

Respective individual detector IDs are set for the detectors 4 and are managed together with the positional information as to where the detectors 4 are provided. A database whereby the detector IDs and the locations of installation of detectors 4 having these detector IDs are associated is stored in the positional information database 5b described above. It is thereby possible to ascertain location within the hotel or facility from the detector ID.

A detector 4D is provided at the front desk 31. The detector 4D is specified and its location is specified by means of the detector ID (for example, P-1101) that is set in the detector 4D. Also, in the front desk 31, there is installed a terminal 41 that performs the various front desk tasks, being connected with for example the hotel server 6, house card server 7, service server 8, and totalizing/analysis server 12. The front desk terminal 41 is connected with the positional information management server 5 and has the function of acquiring positional information.

Detectors 4A to 4C are provided in each guest room 32A to 32C; the detectors 4A to 4C are identified and their location can be specified by means of the detector ID that is set in each detector 4A to 4C (for example P-0101 to P-0999). Also, set-top boxes 51 to 53 may be provided for users of the casino or games by the intranet or multimedia services such as music or video may be used online in the guest rooms 32A to 32C.

Detectors 4E to 4F are installed in the amusement facility 33 and the detectors 4E to 4F are specified and their locations can be specified by means of the detector IDs (for example, P-8001 to P-8999) that are set in the detectors 4E to 4F. Also, the amusement installation 33 comprises various types of game machines 61 to 62 and a card terminal 42 whereby settlement of deposits is performed using the house card or like. Also, this card terminal 42 may be given a function of acquiring positional information by being connected with the positional information management server 5.

Detectors 4G to 4H are installed in the restaurant 34; the detectors 4G to 4H are identified and their location can be identified by means of the detector IDs (for example, P-7001 to P-7999) that are set in the detectors 4G to 4H. Also, a terminal 71 whereby settlement is performed and a card terminal 43 for performing settlement of deposits are installed in the restaurant 34. It should be noted that this card terminal 43 is also connected with the positional information management server 5 and is provided with a function of acquiring positional information.

Detectors 4I to 4J are installed at the bar 35; the detectors 4I to 4J can be specified and their location specified by means of the detector IDs (for example, P-6001 to P-6999) that are set in these detectors 4I to 4J. Also, at the bar 35, there are provided a cash register terminal 72 for performing settlement and a card terminal 44 for performing deposit settlement. It should be noted that this card terminal 44 is also connected with the positional information management server 5 and also has the function of acquiring positional information.

Detectors 4K to 4L are installed at various locations in the hotel 36; the detectors 4K to 4L can be specified and their location can be specified by means of the detector IDs (for example P-2001 to P-5999) that are set in these detectors 4K to 4L. Also, a card terminal 44 is installed in the hotel 36. This card terminal 44 is also connected with the positional information management server 5 and has the function of acquiring positional information.

In addition, a restricted area 37 to which only entry of predetermined specified persons is permitted, entry of other persons being restricted, is provided in the hotel. A plurality of detectors 4M are installed also in this restricted area 37; the detectors 4M are specified and their location is specified by means of the detector IDs (for example, P-4001 to P-4999) that are set in the detectors 4M.

Figure 3:
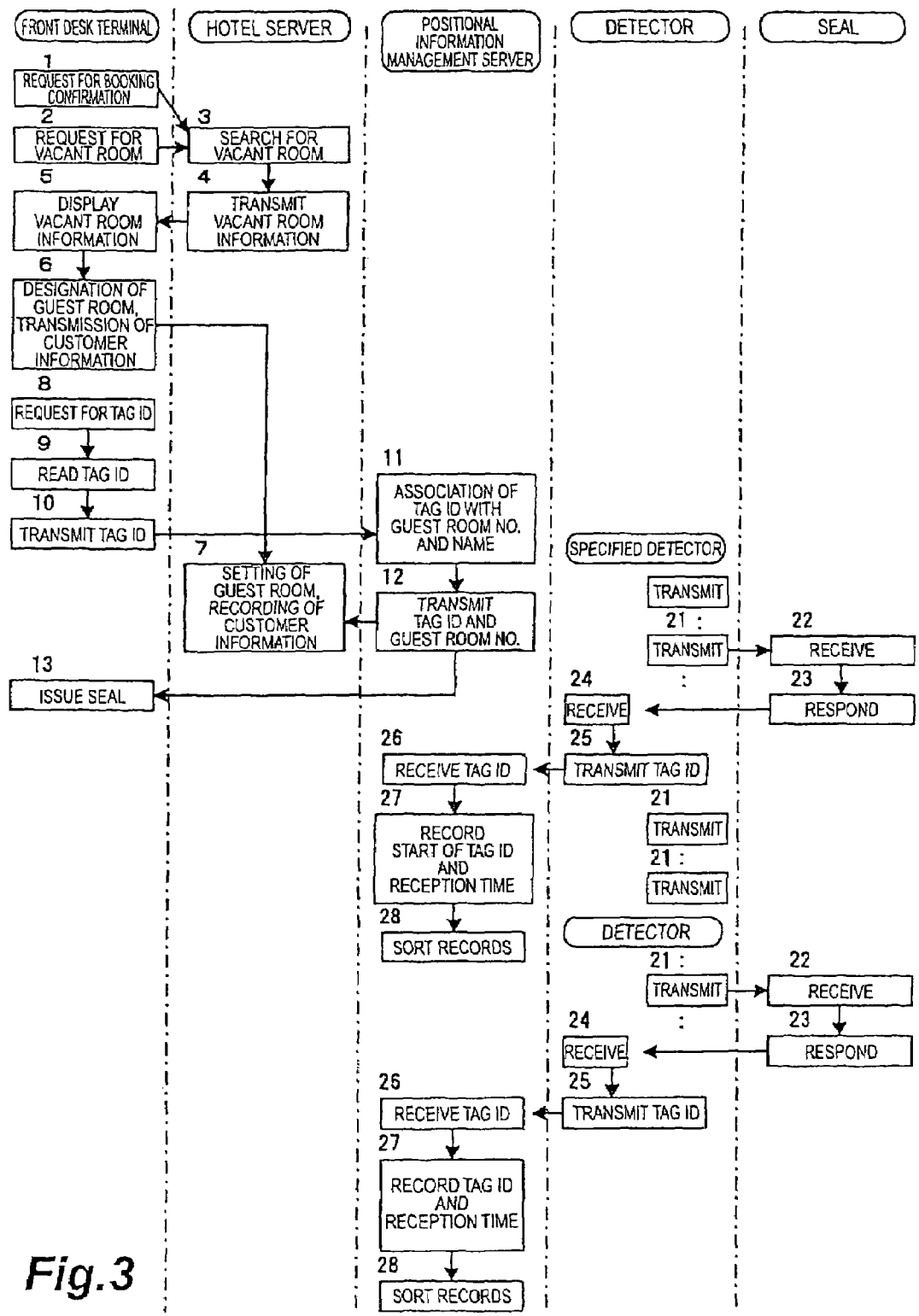
FIG. 3 is a diagram of operating condition given in explanation of the operation of a positional information management system according to the present invention.

Next, the operation of a positional information management system according to the present invention will be described with reference to FIG. 3. The numbers indicated herein below in brackets ( ) correspond to the numbers associated with the respective operations in FIG. 3.

The operations (1) to (13) herein below indicate a tag (sticker) issuing operation and the operations (21) to (28) indicate positional information acquisition operations.

First of all, issuing of a tag (sticker) will be described. When a booking confirmation request or a room request is issued (1, 2) to the hotel server from the front desk terminal on reception of the guest at the front desk, the hotel server searches for a vacant room (3) and transmits vacant room information to the front desk terminal (4). This vacant room information is displayed (5) at the front desk terminal. After the guest room to be used has been determined, the front desk terminal transmits the guest room No. and/or customer information to the hotel server and transmits (6) for example the guest room No. and/or customer's name and/or information as to the number of the credit card whereby payment on settlement will be performed to the positional information management server.

The hotel server performs setting of the guest room in accordance with the information that is transmitted thereto and records the customer information (7). When use of tags is requested (8) tags to the number that are to be employed are taken out from the tags that are available at the front desk terminal and the tag IDs attached to these tags are read (9) and the tag IDs that have thus been read are transmitted (10) to the positional information management server. The positional information management server, using the information that has been transmitted thereto, associates and records (11) the correspondence relationship between the tag ID and the guest room No., and transmits (12) the information of this tag ID and the guest room No. to the hotel server and front desk terminal. Using the tag ID that has thus been received, the hotel server adds the tag ID to the aforesaid customer information and records (7) this tag ID and the guest room No. information. Also, the front desk terminal issues to the customer a tag (sticker) in which this tag ID that has thus been received is set (13).

Acquisition of positional information is conducted by exchange of signals between the detectors and the tag ICs of the cards. A call signal for performing exchange of signals with the tag ICs is transmitted (21) constantly or at prescribed time intervals from a plurality of detectors installed in the hotel and facilities.

When, as the personal belonging to which the tag 2 is attached moves., the tag 2 approaches some detector 4, the tag IC 3 provided in the tag 2 receives (22) a signal sent from the detector 4 and sends (23) a response signal including its tag ID. The detector 4 receives (24) this response signal. The detector 4 reads the tag ID from the response signal which it receives and transmits (25) this tag ID and its detector ID to the positional information management server 5.

The positional information management server 5 receives (26) the tag ID and the detector ID and records these (27) together with the time-point information at which they were received and sorts (28) the recordings. The aforesaid processes (21) to (28) are performed in respect of each detector that is installed in the hotel or facility.

Figure 4A:
FIG. 4A is a signal diagram (formation timing signal) given in explanation of how signals are exchanged between a tag IC and a detector.
Figure 4B:
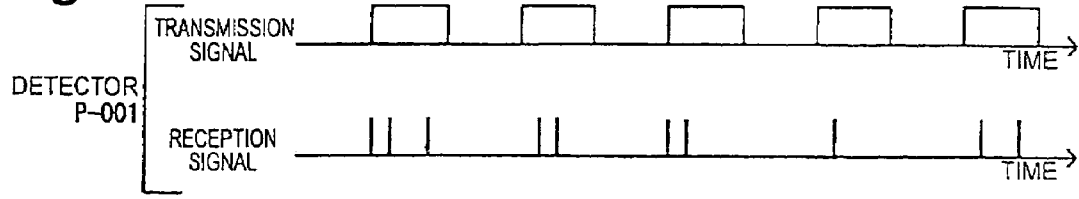
FIG. 4B is a signal diagram (signals exchanged by detector P-001: transmission signal disconnection) given in explanation of how signals are exchanged between a tag IC and a detector.
Figure 4C:
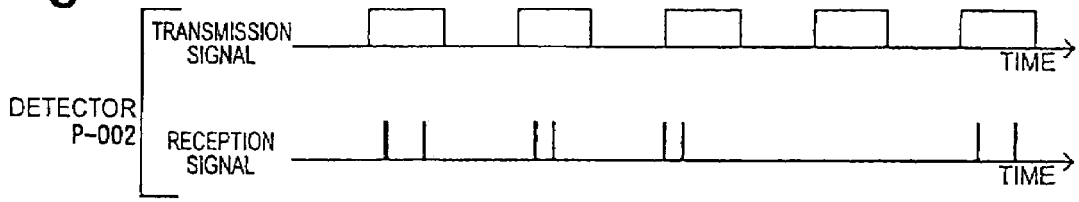
FIG. 4C is a signal diagram (signals exchanged by detector P-002: transmission signal disconnection) given in explanation of how signals are exchanged between a tag IC and a detector.
Figure 4D:
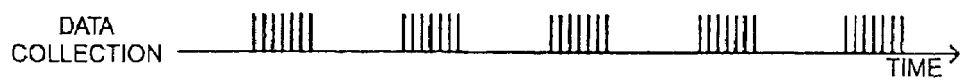
FIG. 4D is a signal diagram (data collection signal) given in explanation of how signals are exchanged between a tag IC and a detector.
Figure 4E:
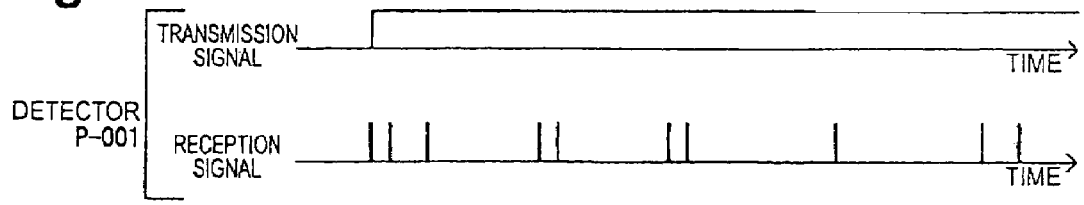
FIG. 4E is a signal diagram (signals exchanged by detector P-001: transmission signal continuation) given in explanation of how signals are exchanged between a tag IC and a detector.
Figure 4F:
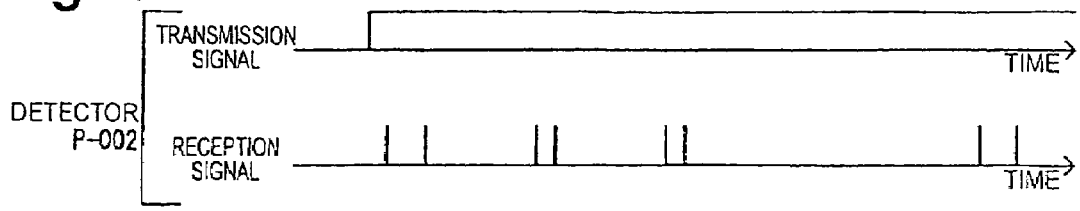
FIG. 4F is a signal diagram (signals exchanged by detector P-002: transmission signal continuation) given in explanation of how signals are exchanged between a tag IC and a detector.

FIGS. 4A-4F are signal diagrams given in explanation of the way in which signals are exchanged between a tag IC and detector. Exchange of signals between the tag IC and the detector may be performed at predetermined time intervals or may be performed constantly. That is, the carrier wave may be transmitted intermittently at prescribed intervals or may be continuously transmitted. FIGS. 4A-4D show an example where transmission is performed at prescribed time intervals and FIGS. 4E, 4F, and 4D show an example where transmission is performed constantly.

In the case where transmission is performed at prescribed time intervals, the prescribed time interval at which signal exchange is conducted may be set by means of a formation timing signal as shown in FIG. 4A. The detector 4 generates a transmission signal (transmission signal in FIGS. 4B and 4C) in response to this formation timing signal of FIG. 4A. The detector 4 receives (received signals in FIGS. 4B and 4C) the response signal transmitted from the tag IC 3 in response to this transmitted signal. The reception signals detected by the detectors 4 are collected by the positional information management server (FIG. 4D).

Also, in the case where signal exchange is conducted constantly, the detector 4 generates a transmission signal (transmission signals in FIGS. 4E and 4F). The detector 4 receives (received signal in FIGS. 4E and 4F) a response signal transmitted from the tag IC 3 in response to this transmission signal. The Figure shows the detection of a single peak in the received signal. The received signals detected by the detectors 4 are collected by the positional information management server (FIG. 4D).

Figure 5:
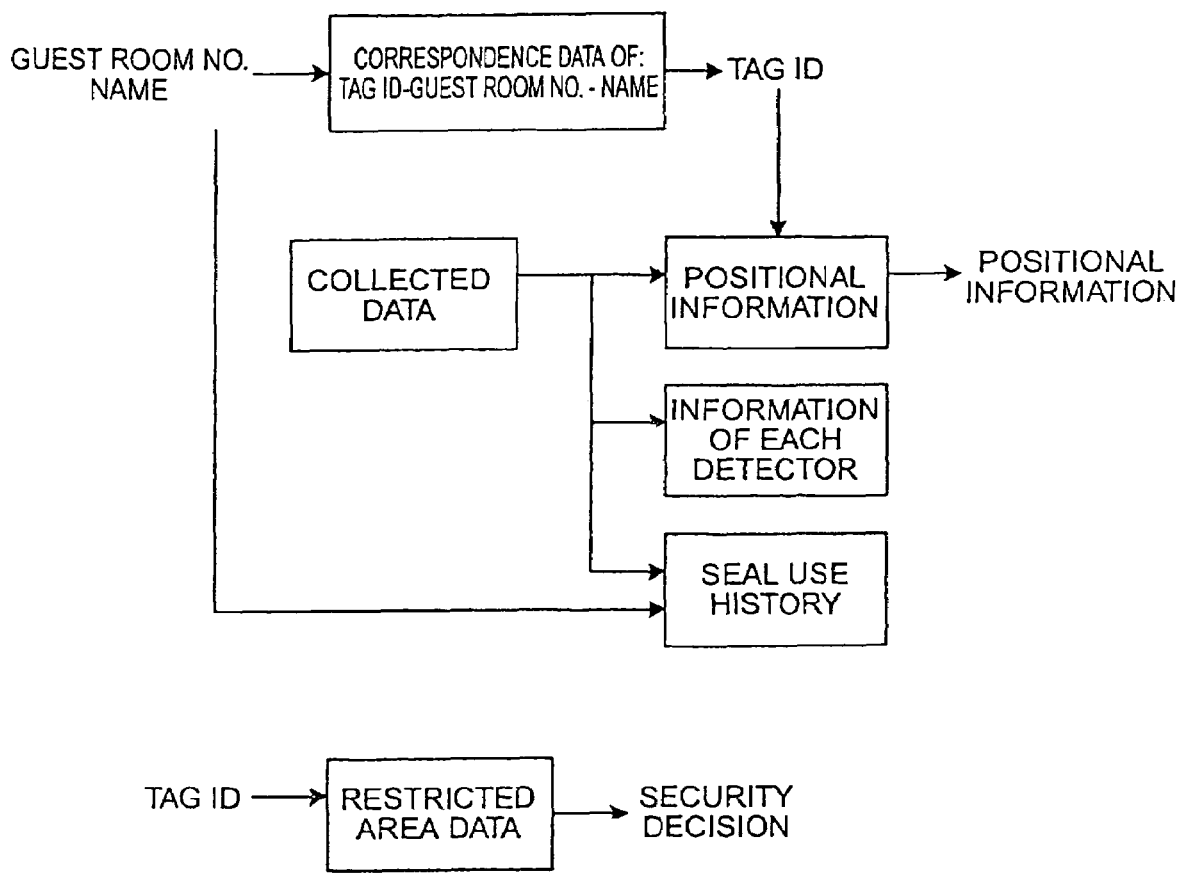
FIG. 5 is a view showing in tabular form an example of an information mode using a positional information management system according to the present invention.

Next, an example of utilization of the information obtained by the positional information management system according to the present invention will be described with reference to FIG. 5 or to FIG. 11. FIG. 5 shows an example of utilization of information obtained by a positional information management system according to the present invention. The collected data collected from the detectors includes tag IDs, detector IDs and time-point information.

FIG. 6 shows an example of the collected data. As the collected data, the detected tag ID and detector ID (or detector location) are recorded in the order of detection time. Since the detector IDs and detector locations are in one-to-one correspondence, both the detector ID and detector location can be recorded. If the detector ID of the detector is recorded, it is possible to ascertain the location of installation thereof by referring to the correspondence relationship of the detector IDs and installation locations.

The positional information of each personal belonging can be acquired by sorting this collected data using the tag ID. Customers' personal belongings (see FIG. 7) and the staff's personal belongings can also be differentiated and the respective positional information thereof acquired.

FIG. 8 is an example of positional information of a personal belonging. The positional information of a personal belonging is formed from the collected data by extracting the time information at which a specified personal belonging was detected and the positional information thereof, using the tag ID as an index. In FIG. 8, as an example, the detected locations of personal belongings to which are attached tags having tag ICs represented by the tag IDs T-*1001, T-*1002, ..., T-***2003 and the times thereof are shown in the form of time sequences.

It should be noted that, as shown in FIG. 8, a not-permitted flag could be provided in respect of each tag (personal belonging). With this flag, it is possible to establish beforehand for each tag ID regions to which carry-on of the tag ID (or for example, distribution or transportation thereof) is permitted and regions to which it is not permitted. If the detected location is in a region to which carry-on is permitted, for example "0" is recorded; if the detected location is in a region to which carry-on is not permitted, for example "1" is recorded. This not-permitted flag can also be utilized for security management by detecting carry-on of the personal belonging to a restricted region by setting a not-permitted flag for each detector ID in respect of the personal belonging.

Movement history regarding personal belongings at each location can be acquired by sorting the collected data in accordance with detector ID. FIG. 9 shows an example of movement history of personal belongings at a specified location. Movement history of personal belongings at a specified location can be formed by extracting from the collected data the time-point information and tag ID detected at this specified location, using the detector ID as an index. As an example, FIG. 9 shows the detected tag IDs of tags and their time-points in the form of a time sequence at the locations of detectors represented by detector IDs P-1001, P-1002. It should be noted that, in the state of movement of customers' personal belongings at each such location and that of the staff's personal belongings can be distinguished.

In FIG. 5, utilization history information for each tag ID (each tag) can be acquired by sorting the collected data in accordance with tag ID. FIG. 10 shows an example of utilization history information of each tag. Tag utilization history information can be formed by extracting from the collected data the time-point information at which the tag was utilized, using the tag ID as an index. In FIG. 10, as an example, the tag utilization history of the tag IDs T-*1001 to 1003 and T-*1234 is shown as a time sequence. This can be linked with guest room No. utilization history by utilizing the correspondence relationship between tag ID and guest room No. By using the utilization history information of each of these tag IDs (each tag), it is possible to take rapid counter-measures if a personal belonging is lost.

FIG. 7 described above is an example of correspondence data showing the correspondence relationship between tag ID and guest room No. and the name of the customer who is the owner of a personal belonging. Although not shown in the drawing, data can also be generated showing the correspondence relationship between tag ID and the staff number of the staff member who is the owner of a personal belonging. In respect of a customer's personal belonging, this correspondence relationship may be set up at the front desk or may be set up in the hotel server or positional information management server. And in respect of a staff's personal belonging (for example hotel equipment), this correspondence relationship may be set up beforehand in the hotel server or positional information management server.

Also, by utilizing the correspondence relationship between this tag ID and guest room No. and the correspondence relationship between tag ID and staff No., even if only the guest room No. or staff No. is known, but the tag ID is not known, by using this correspondence relationship, it is possible to read the positional information of the personal belonging by reading the tag ID from the guest room No. or staff No.

By setting up a restricted region into which carry-on (or distribution or transportation thereof) of tag IDs (personal belongings) into the hotel or facility is restricted and comparing the detected tag IDs with the restricted region data, such carry-on of personal belongings into the restricted region can be detected and appropriate security decisions made. FIG. 11 shows an example of restricted region data. As shown in FIG. 11, a restricted region of tag ID is defined in terms of detector ID. If the detected location (detector ID) is within the restricted region, if it is determined that a personal belonging has been imported into the restricted region, for example a not-permitted flag as in FIG. 8 is set.

Next, searching for a personal belonging using the positional information that has been recorded will be described. By means of such search processing for a personal belonging, it is easy to conduct a search for customer's personal belongings or staff personal belongings (hotel equipment) that have been lost in the hotel or facilities.

Figure 12:
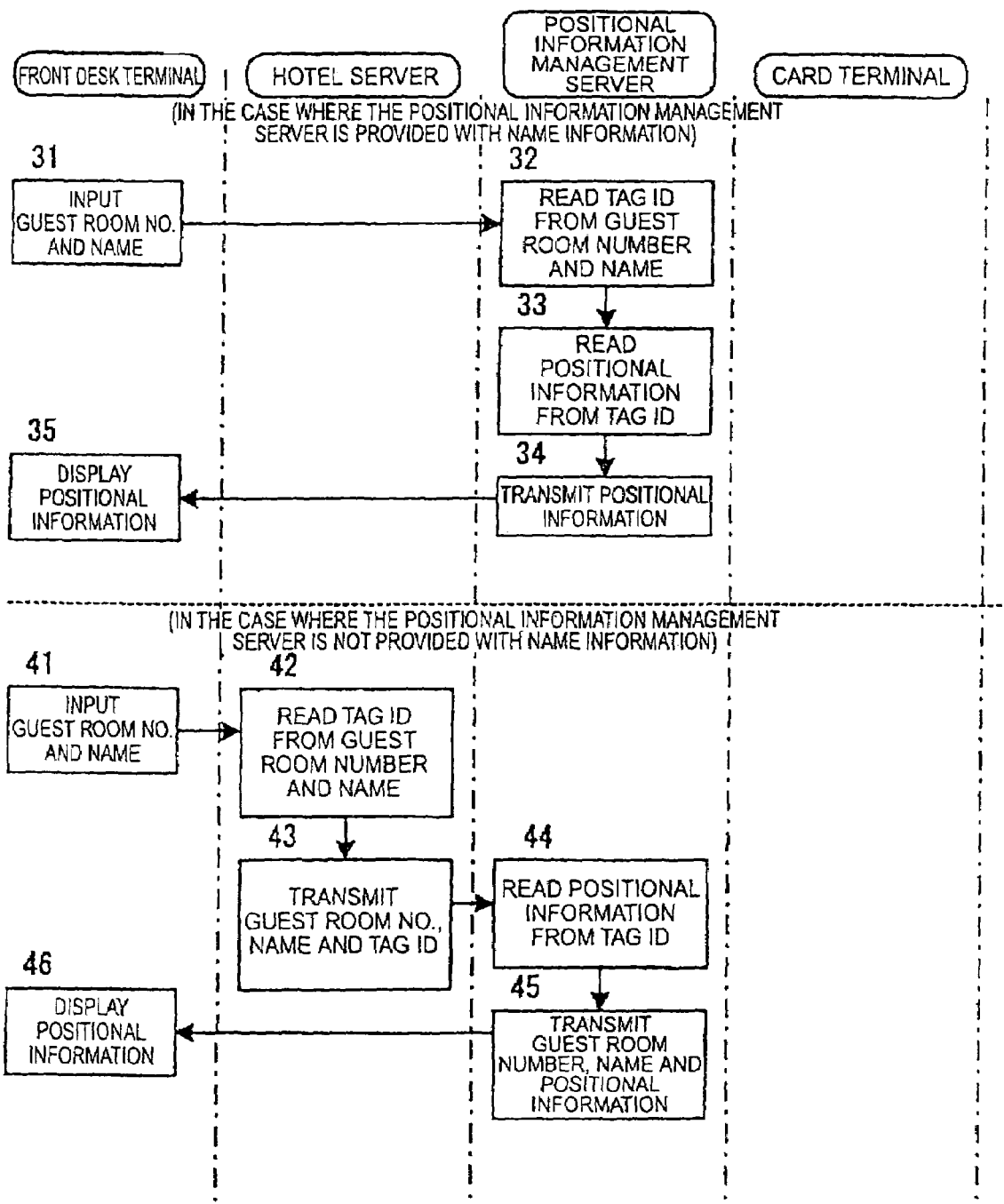
FIG. 12 is a diagram of operational condition given in explanation of searching for a personal belonging using a positional information management system according to the present invention.

First of all, searching for a personal belonging using the front desk terminal will be described using the operating condition diagram of FIG. 12. In FIG. 12, (31) to (35) show the case where the positional information management server is provided with customer name information and (41) to (45) show the case where the positional information management server is not provided with customer name information.

First of all, the case where customer name information is provided in the positional information management server will be described with reference to the upper part of FIG. 12. When searching for the location of a personal belonging by using the front desk terminal, the guest room No. and/or name of the user who carries the personal belonging is input at the front desk terminal and is then transmitted (31) to the positional information management server. If only a single person is using the guest room, the article that is being sought can be specified solely by means of the guest room No. If two or more persons are using the guest room, the article that is being sought can be identified using the guest room number and name. It should be noted that, even if two or more persons are using the same room, it is not necessary to identify the owner of the article that is being sought by name if either the tag ID of the article that is being sought is known or the tag ID of the tag that is attached to another personal belonging of the owner of the personal belonging that is being sought is known. It is also possible for the guest room No. to be read and input at the front desk terminal using the tag of another personal belonging of the owner of the personal belonging that is being sought.

The positional information management server reads (32) the tag ID based on the correspondence relationship between guest room No. (name) and tag ID of the tag attached to the personal belonging, using the guest room No. (and/or name) that are input from the front desk terminal. Using the tag ID that has thus been read, the positional information management server reads (33) the positional information and transmits (34) this to the front desk terminal. The front desk terminal then displays (35) the positional information that has been thus transmitted thereto.

Next, the case where the positional information management server is not provided with the name information of customers will be described with reference to the lower part of FIG. 12. The name information of the user who carries the personal belonging is stored by the hotel server. In this case, the guest room No. (and/or the name) are input at the front desk terminal and the guest room No. (name) is transmitted (41) to the hotel server from the front desk terminal. Using the guest room No. (name) that is input thereto from the front desk terminal, the hotel server then reads (42) the tag ID of the tag attached to the personal belonging, using the correspondence relationship between guest room No. (name) and personal belonging, and transmits (43) the guest room No. (name) and tag ID to the positional information management server.

The positional information management server reads (44) the positional information using the tag ID that has thus been transmitted and transmits (45) the guest room No., name and positional information of the personal belonging to the front desk terminal. The front desk terminal displays (46) the positional information that has thus been transmitted thereto. FIG. 13 is an example of the data provided on the hotel server; by setting the tag ID of the tag attached to the personal belonging in addition to the information of the guest room No. and/or user, the correspondence relationship of guest room No., name and tag ID can be recorded.

Apart from the front desk terminal, searching for a personal belonging can also be performed from a card terminal that is installed in the hotel or a facility thereof. A card terminal handles house cards as described above. Such a house card also has a tag ID like the tags that are attached to the personal belongings and correspondence is established between for example the name or guest room No. in the data shown in FIG. 13 in the hotel server. The card terminal can read the tag ID of the tag that is attached to this house card or personal belonging.

Figure 14:
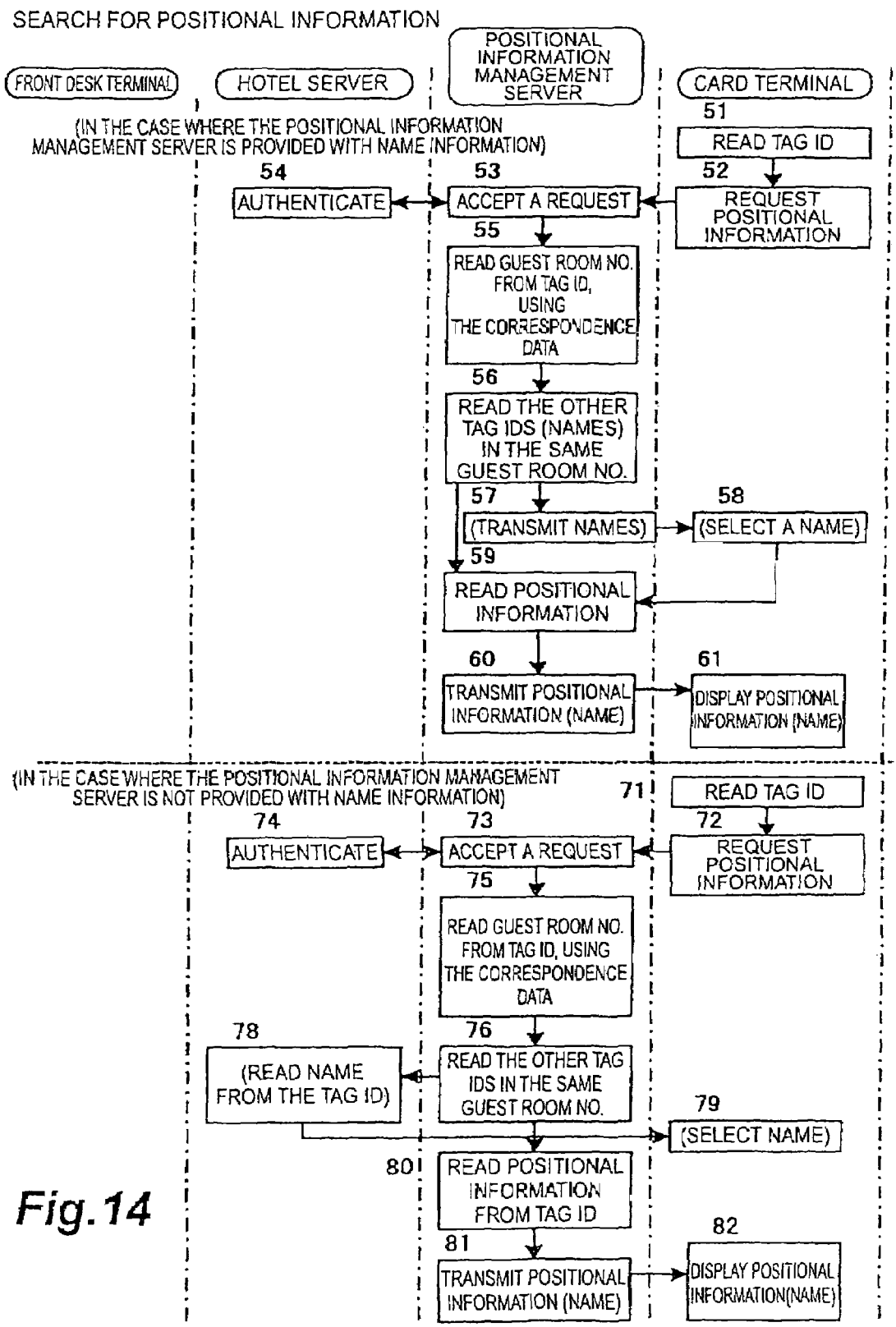
FIG. 14 is a diagram of operational condition given in explanation of searching for a personal belonging using a positional information management system according to the present invention.

The case of searching for a personal belonging using a card terminal will be described with reference to the upper part of FIG. 14, taking as an example a given user searching for a personal belonging of another user of the same room. First of all, the one user causes (51) the tag ID of the card (or the tag of a personal belonging) which this user is himself carrying to be read from the card terminal and requests (52) the positional information management server to provide the positional information of the personal belonging (tag) of the other user.

On receipt of this request, the positional information management server requests (53) the hotel server for authentication. The hotel server performs authentication using the information read from the card. This authentication may involve authentication of the user who has made the request or authentication as to whether or not the positional information of the article whose positional, information has been requested is permitted to be provided to others. For example, as shown in FIG. 13, authentication data as to whether or not provision of information is permitted may be set in the hotel server in the personal belonging information. Granting or withholding permission for the provision of positional information of a personal belonging is effected with reference to this authentication data. For example, regarding the data that the guest room No. is R-101, provision of information is permitted in respect of the tags (personal belongings) of tag ID T-*1001 to 1010 and provision of information is not permitted in respect of tags (personal belongings) of tag ID T-*1011 to 1020.

In this case, if the location of the tag (personal belonging) of tag ID T-*1011 is requested, since provision of information regarding tags (personal belongings) of tag ID T-*1011 is not permitted, authentication cannot be performed and the location of the tag (personal belonging) of T-*1011 cannot be acquired. In contrast, if the location of the tag (personal belonging) of tag ID T-*1001 is requested, since provision of information regarding tags (personal belongings) of tag ID T-*1001 is permitted, authentication is performed and the location of the tag (personal belonging) of T-*1001 can be acquired (54).

After the positional information management server has obtained authentication from the hotel server, the positional information management server reads (55) the guest room No. from the tag ID of the card of the user who requested the positional information, using the correspondence data. The positional information management server then reads (56) the tag IDs of the house cards of the other users of the same room that are recorded in this guest room No. (or names of the other users of the same room) If the tag ID (or name) that is thus read is that of a single individual, the positional information of the personal belonging is read (59), using the tag ID of the personal belonging of this user. If the tag IDs (or names) that are thus read are those of two or more persons, the candidate names are transmitted (57) to the card terminal from the positional information management server. A name is then selected (58) at the card terminal from among the plurality of candidate names that have thus been received and the positional information of the personal belonging is read (59) using the tag ID of the personal belonging of the user, in accordance with the selected name. The positional information that is thus read is then transmitted (60) to the card terminal together with the name of the owner and displayed (61) at the card terminal.

Next, an example of searching by one user for a personal belonging of another user of the same room in the case where the positional information management server is not provided with customer name information is described with reference to the lower part of FIG. 14. The one user causes the tag ID of the card (or the tag of a personal belonging) which this user is himself carrying to be read (71) from the card terminal and requests (72) the positional information management server to provide the positional information of the personal belonging (tag) of the other user.

On receipt of this request, the positional information management server requests (73) the hotel server for authentication. The hotel server performs authentication (74) in the same way as described above (54). After obtaining authentication from the hotel server, the positional information management server reads (75) the guest room No. from the tag ID of the card of the user who requested the positional information, using the correspondence data. The positional information management server then reads (76) the tag IDs (or names) of the house cards of the other users of the same room that are recorded in this guest room No. If the tag ID (name) that is thus read is that of a single individual, the positional information of the personal belonging is read (77) using the tag ID of the personal belonging of the user. If the tag IDs (names) that are thus read are those of two or more individuals, the candidate names are transmitted to the card terminal from the hotel server. A selection of a name from the plurality of candidate names that have thus been received is then made (79) at the card terminal and the positional information of the personal belonging is read (80) in accordance with the tag ID of the personal belonging of the user whose name has thus been selected (80). The positional information that has thus been read is then transmitted (81) to the card terminal together with the name of the owner and displayed (82) on the card terminal.

With a positional information management system according to present invention, service provision can be performed in accordance with the positional information. In addition, service management means that manages services in respect of customers i.e. users may be provided. The service management means sends the tag ID of the tag that is carried by the customer to the positional information management means. The positional information management means finds the detector ID that forms a set with this tag ID and sends information as to the location of installation of the detector corresponding to this detector ID to the service management means. It should be noted that, when the information as to the location of installation of the detector ID that forms a set with the tag ID is sent to the service management means, this "installation positional information" is termed "positional information". The service management means manages the service that is provided in respect of the personal belonging of the customer by using this positional information of the tag.

Figure 15:
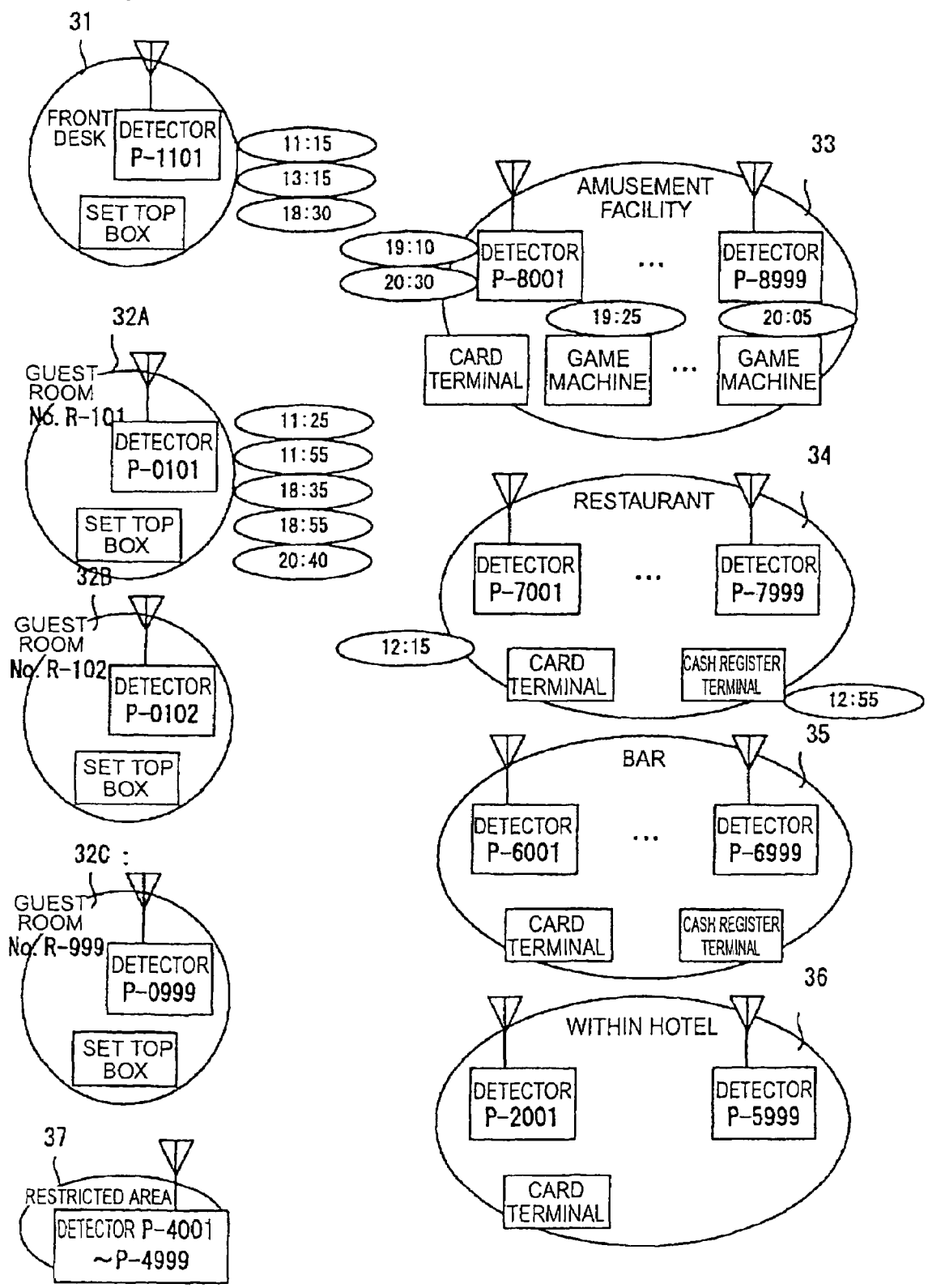
FIG. 15 is an example of the display of movement history in a positional information management system according to the present invention.

The positional information management server can also display the movement history of a personal belonging by using the acquired positional information history. FIG. 15 shows an example of the display of movement history in respect of a single personal belonging; this shows how the personal belonging has moved, together with the times of such movement, at the various locations within the hotel or facility. It should be noted that this is merely one example of a display and display could be effected in any other desired mode such as for example tabular display (for example display at each game table in a casino)

Figure 16:
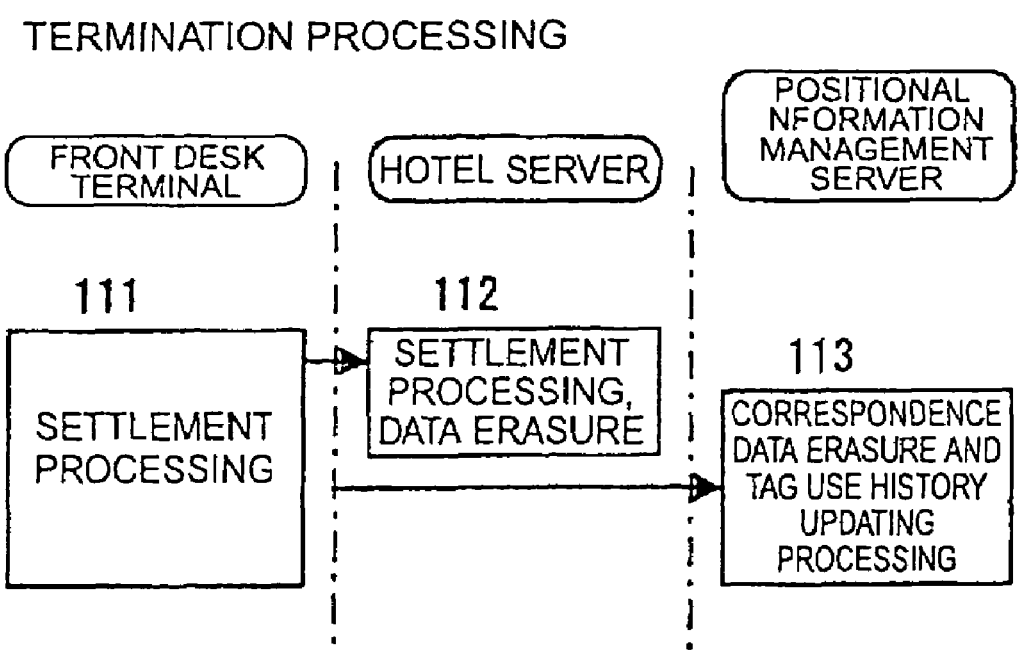
FIG. 16 is a diagram of operational condition given in explanation of tag termination processing in a positional information management system according to the present invention.

Processing on termination of tag use may be performed simply by erasing the tag data; the tag itself is discarded and not re-used. Security can be enhanced by not re-using tags. FIG. 16 is a diagram of operational condition given in explanation of the processing on termination of tag use. When the user requests (111) settlement at the front desk terminal, the hotel server performs settlement processing on receiving this request for settlement and erases (112) the data of the tag in the positional information management server. Also, on receiving this request for settlement, the positional information management server erases the correspondence data and updates (113) the use history of tag. It should be noted that the tag IDs and detector IDs described above constitute merely one example and could be set at will.

With a positional information management system according to the present invention, positional information of articles of a user can be obtained in a hotel and the various facilities with which the hotel is provided. Since it is possible to ascertain the location of personal belongings within the hotel or facility, lost personal belongings can be searched for by using the position and/or movement history of the personal belonging and security of the hotel or facility can be improved. Also, by ascertaining the location of personal belongings of staff within the hotel or facility, management of equipment and private property employed by staff can be achieved and the security of the hotel or facility can be improved.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A positional information management system for a hotel comprising:
    a tag attached to an article in the hotel and having a tag integrated circuit (IC) storing a tag identification (ID);
    a plurality of proximity detectors located at respective detector locations in the hotel, each detector having a respective detector ID, each proximity detector detecting the tag ID from the tag IC when the tag is within a respective detection range of the proximity detector, and transmitting the tag ID that is detected and the detector ID;
    a computer network including and providing communication between
        a hotel server programmed to manage hotel tasks and including a memory recording relationships between a customer, a house card issued to the customer for payment for hotel services, and the tag ID of a tag attached to an article belonging to the customer,
        a house card server programmed to manage accounts when a customer employs a house card, issued to and indentifying the customer, in payment for a hotel service, and programmed to authenticate a house card that has been issued to a customer,
        a plurality of card terminals located at respective terminal locations in the hotel for reading a house card that identifies the customer to whom the house card has been issued, for transacting payment for hotel services through the house card read and authenticated by the house card server, and for input of a tag ID, and
        a positional information management server programmed to receive, record, manage, and supply the tag ID detected and the detector ID of the proximity detector detecting the tag ID, from each of the plurality of proximity detectors, as pairs of the tag ID detected and the detector ID, and time at which the respective proximity detector detected the tag ID, and to specify location of the article based upon detection of the tag ID and the detector ID of the proximity detector detecting the tag ID, wherein the positional information management server is programmed to search for the location of the article in response to reading of a house card by one of the card terminals, authentication of the house card by the hotel server, and input to the card terminal of the tag ID associated with the house card read, and is programmed to send results of the search to the card terminal reading the house card.

2. The positional information management system according to claim 1, wherein the tag comprises a detachable sticker.

3. The positional information management system according to claim 1, wherein the positional information management server is programmed to produce a movement history of the article from locations of the article based on the detector IDs of the proximity detectors that have detected the tag ID, and the time of detection.

4. The positional information management system according to claim 1, wherein the positional information management system detects movement of the article based on the respective detection ranges and the tag ID detected in the respective detection ranges.

5. The positional information management system according to claim 1, wherein the positional information management server is programmed to determine a detection area defined by at least one of the proximity detectors and to determine whether the article is in the area, based on the detector ID and the tag IDs detected in the area.

6. The positional information management system according to claim 5, wherein the positional information management server is programmed to define the area as a restricted area and is programmed to manage security by generating an alarm or by setting a flag when the article is in the restricted area.

7. The positional information management system according to claim 1, wherein the hotel server is programmed to record a relationship between name of the customer to whom a house card has been issued and the tag ID of the article belonging to the customer and the positional information management server is programmed to search for the location of the article in response to input of the name of the customer into the card terminal.

8. The positional information management system according to claim 1, wherein,
    based on a tag ID and a room number of a customer that are transmitted from the positional information management server, the hotel server adds the tag ID to the customer information and records the tag ID in the memory of the hotel server, and
    the tag in which the tag ID has been set is issued to the customer at a front desk terminal.

9. The positional information management system according to claim 1 wherein, when a customer requests settlement, in settling the customer's account, the hotel server instructs the positional information management server to erase data concerning the tag ID of the customer.

10. The positional information management system according to claim 9 wherein, in response to an instruction from the hotel server to erase the data concerning the tag ID of the customer, the positional information management server erases data concerning previous use of the tag having the tag ID of the customer and updates current use of the tag ID of the customer.

* * * * *